(12) United States Patent
vonThenen

(10) Patent No.: US 9,026,500 B1
(45) Date of Patent: May 5, 2015

(54) RESTORING VIRTUAL MACHINE DATA

(71) Applicant: EMC Corporation, Hopkinton, MA (US)

(72) Inventor: David vonThenen, Irvine, CA (US)

(73) Assignee: EMC Corporation, Hopkinton, MA (US)

( * ) Notice: Subject to any disclaimer, the term of this patent is extended or adjusted under 35 U.S.C. 154(b) by 182 days.

(21) Appl. No.: 13/725,740

(22) Filed: Dec. 21, 2012

(51) Int. Cl.
*G06F 17/30* (2006.01)
*G06F 11/14* (2006.01)

(52) U.S. Cl.
CPC .................. *G06F 11/1448* (2013.01)

(58) Field of Classification Search
CPC .......................... G06F 11/1469; G06F 11/1484
USPC .................................................. 707/769, 679
See application file for complete search history.

(56) References Cited

U.S. PATENT DOCUMENTS

| | | | | |
|---|---|---|---|---|
| 6,816,957 | B1* | 11/2004 | Halladay et al. | 711/170 |
| 2007/0011179 | A1* | 1/2007 | Paval | 707/100 |
| 2012/0284236 | A1* | 11/2012 | Timashev et al. | 707/674 |
| 2013/0238867 | A1* | 9/2013 | Hayashi | 711/162 |

OTHER PUBLICATIONS

VMware, VMware Data Recovery 1.0 Evaluator's Guide, 2009, VMware Inc., Revision: 20090730, pp. 1-24.*

* cited by examiner

*Primary Examiner* — Rehana Perveen
*Assistant Examiner* — Alexander Khong
(74) *Attorney, Agent, or Firm* — Van Pelt, Yi & James LLP

(57) ABSTRACT

A system for restoring a backup data comprises a processor and a memory. The processor is configured to: 1) receive an indication to restore a backup data to a virtual storage device location; 2) determine a map between a virtual storage device volume name and a virtual storage device backup serial number; and 3) retrieve backup data from the virtual storage device backup. The memory is coupled to the processor and configured to provide the processor with instructions.

19 Claims, 12 Drawing Sheets

1100

| Master Boot Record | | | |
|---|---|---|---|
| Address | Description | | Size In Bytes |
| 0 | Bootstrap Code Area (part 1) | | 218 |
| 218 | 0000h | Disk Timestamp | 2 |
| 220 | original physical drive | | 1 |
| 221 | seconds | | 1 |
| 222 | minutes | | 1 |
| 223 | hours | | 1 |
| 224 | Bootstrap Code Area (part 2) | | 216 |
| 440 | Disk Signature | | 4 |
| 444 | 0000h | | 2 |
| 446 | Partition Entry 1 | Partition Table | 16 |
| 462 | Partition Entry 2 | | 16 |
| 478 | Partition Entry 3 | | 16 |
| 494 | Partition Entry 4 | | 16 |
| 510 | 55h | Boot Signature | 1 |
| 511 | AAh | | 1 |

| NTFS Boot Sector Header | | |
|---|---|---|
| Byte Offset | Field Name | Field Length |
| 0x0B | Bytes per Sector | Word |
| 0x0D | Sectors per Cluster | Byte |
| 0x0E | Reserved Sectors | Word |
| 0x10 | reserved | 3 Bytes |
| 0x13 | not used | Word |
| 0x15 | Media Descriptor | Byte |
| 0x16 | reserved | Word |
| 0x18 | Sectors per Track | Word |
| 0x1A | Number of Heads | Word |
| 0x1C | Hidden Sectors | DWord |
| 0x20 | not used | DWord |
| 0x24 | not used | DWord |
| 0x28 | Total Sectors | QWord |
| 0x30 | $MFT Start Cluster | QWord |
| 0x38 | $MFTmirr Start Cluster | QWord |
| 0x40 | Clusters per FRS | DWord |
| 0x44 | Clusters per Index | DWord |
| 0x48 | Volume Serial Number | QWord |
| 0x50 | CRC | DWord |

Fig. 12

RESTORING VIRTUAL MACHINE DATA

BACKGROUND OF THE INVENTION

A virtual machine is a simulation of a computer system running within another host computer system. The virtual machine can be running the same operating system as the host computer system, or it can be running a different operating system. The virtual machine can include one or more virtual disks for data storage. One advantage of using a virtual machine is that the entire virtual machine system, along with its virtual disks, can be copied to a backup storage for preservation. The virtual machine system can then easily be restored to an earlier state in the case of data loss or system corruption. Some virtual machine backup systems create a single large backup file for the virtual machine and all of its associated data storage. However, some backup systems are able to separate the backup information for the virtual machine itself from the backup information for each of the virtual disks associated with the virtual machine. When a virtual machine backup is created in this way, backup recovery can be considerably more flexible. Backup recovery software can access the virtual disks directly to retrieve one or more files or directories, rather than rebuilding the entire backed up virtual machine and accessing the backup data through it. However, correlating backed up virtual disks to mounted disks on a running virtual machine is difficult, as volume mounting information is assigned arbitrarily when the machine is started up. The backup software is therefore prevented from being able to store a file retrieved from a backed up virtual disk in the correct location on the corresponding running virtual machine.

BRIEF DESCRIPTION OF THE DRAWINGS

Various embodiments of the invention are disclosed in the following detailed description and the accompanying drawings.

FIG. 11 illustrates an embodiment of a master boot record.

FIG. 12 illustrates an embodiment of an NTFS boot sector header.

DETAILED DESCRIPTION

Figure 1:
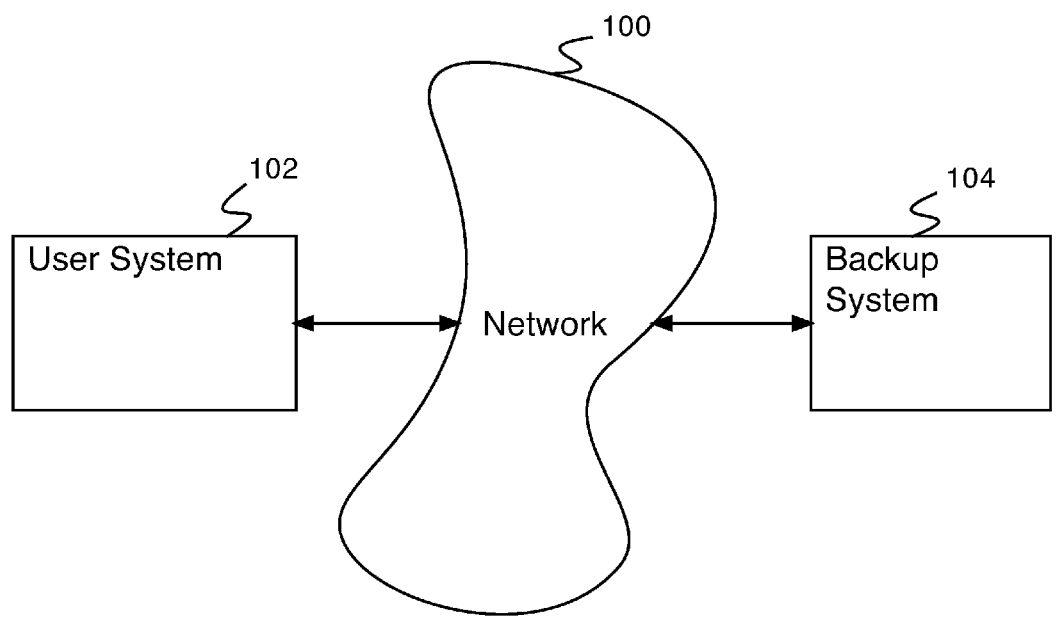
FIG. 1 is a block diagram illustrating an embodiment of a system for restoring virtual machine data.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Restoring virtual machine data is disclosed. A system for restoring a backup data comprises a processor configured to receive an indication to restore a backup data to a virtual disk location; determine a map between a label in the running virtual disk and a backup volume serial number; and retrieve backup data from the backup volume. A system for restoring a backup data additionally comprises a memory coupled to the processor and configured to provide the processor with instructions.

In some embodiments, a system for restoring virtual machine backup data is provided a backup file to recover from a particular location on a backed up virtual disk. The backup file is to be copied to the same location on the corresponding virtual disk associated with a running virtual machine. However, determining a mapping from a set of backed up virtual disks to a set of virtual disks associated with a running virtual machine is difficult. The backup virtual disks can not store volume mounting information indicating what their mounted volume label is to be. In various embodiments, a mounted volume label comprises a label, a volume mount point, or any other appropriate mounted volume identifier. Each time the virtual machine is booted, the disks are mounted and arbitrarily assigned mounted volume labels. In some embodiments, the disks are manually assigned volume labels. Thus, the system does not directly know which mounted virtual disk to copy the recovered backup file to. The system for restoring virtual machine backup data solves this problem by creating a storage device mapping on the running virtual machine. When the virtual machine is booted, the virtual disks are mounted and arbitrarily assigned mounted volume labels. Then the storage device mapping is created. The storage device mapping is a correspondence between the arbitrarily assigned mounted volume labels and a set of volume serial numbers. Volume serial numbers are permanently stored in the header information of each virtual and can be used for identification. When a backup file is to be retrieved from a backed up virtual disk, the volume serial number of the disk is determined, and the storage device mapping is used to determine the mounted volume label of the corresponding virtual disk. The backup file can then be accessed in the backed up virtual disk and stored in the same location on the corresponding virtual disk on the running virtual machine.

In some embodiments, a user restoring one or more directories and/or one or more files from a backup image of a virtual machine with its associated virtual disks, selects the directory(ies) and/or file(s) by 1) locating the directory(ies) and/or file(s) in the backup image of the virtual machine or 2) locating the directory(ies) and/or file(s) in the running virtual machine and selecting a backup image (with its associated date in the past) of the virtual machine. As the volume label (e.g., the letter drive name of a Windows machine, the mount point on a Unix or linux computer, etc.) may not directly correspond between the running virtual machine and the backup image of the virtual machine, the system examines a unique identifier associated with the volume to determine the correct correspondence. In some embodiments, the unique identifier comprises a volume serial number. So, for example, in the event that it is determined that a user is locating the desired data (e.g., directory(ies) and/or file(s)) in the backup image, the system determines a volume identifier associated with the desired data (e.g., the data selected by a user) and determines a matching volume identifier in the running virtual machine. In the event that the user wishes to restore the desired data to its corresponding position in the running virtual machine, the system does so using the volume in the running virtual machine whose volume identifier matches the volume identifier associated with the desired data in the backup image. Or, for another example, in the event that it is determined that a user is locating the desired data (e.g., directory(ies) and/or file(s)) in the running virtual machine, the system determines a volume identifier associated with the desired data (e.g., the data selected by a user by looking in the file system header) and determines a matching volume identifier in the selected backup image (e.g., an image selected by date). In the event that the user wishes to restore the desired data to its corresponding position in the running virtual machine, the system does so using the volume in the running virtual machine whose volume identifier matches the volume identifier associated with the desired data in the backup image. The desired data is stored in the running virtual machine in the volume associated with the volume identifier associated with the desired data.

FIG. 1 is a block diagram illustrating an embodiment of a system for restoring virtual machine data. In the example shown, FIG. 1 comprises network 100. In various embodiments, network 100 comprises one or more of the following: a local area network, a wide area network, a wired network, a wireless network, the Internet, an intranet, a storage area network, or any other appropriate communication network. In the example shown, user system 102 comprises a user system (e.g., a computing system for operation by a user). In some embodiments, user system 102 comprises a system accessed by a user directly (e.g., the user is in proximity with user system 102). In some embodiments, user system 102 comprises a system accessed by a user remotely (e.g., the user is not in proximity with user system 102, and accesses user system 102 via network 100 and a separate user system). User system 102 comprises a system running a virtual machine. The virtual machine running on user system 102 comprises one or more virtual data storage devices. In various embodiments, a user accesses user system 102 to access data on a virtual data storage device, to process data on a virtual storage device, to transfer data to a virtual data storage device, or for any other appropriate purpose. Backup system 104 comprises a computer system for backing up data. Backup system 104 backs up the virtual machine and virtual data storage device or devices running on user system 102. In various embodiments, backup system 104 performs full backups of the virtual machine and virtual data storage device or devices running on user system 102 (e.g., makes complete copies of the data), performs incremental backups of the virtual machine and virtual data storage device or devices running on user system 102 (e.g., makes copies of data modified since the last backup), performs a combination of full and incremental backups of the virtual machine and virtual data storage device or devices running on user system 102, or performs any other appropriate kind of backup. In some embodiments, a backup of the virtual machine and virtual data storage device or devices running on user system 102 comprises a single file. In some embodiments, a backup of the virtual machine and virtual data storage device or devices running on user system 102 comprises a file comprising the virtual machine backup data and a file comprising backup data for each virtual data storage device. In some embodiments, backup system 104 and user system 102 communicate via network 100. In some embodiments, backup system 104 and user system 102 are a single system (e.g., user system 102 stores its own backups). In various embodiments, the processors comprising user system 102 and backup system 104 comprise any one of a variety of proprietary or commercially available single or multi-processor systems (e.g., an Intel-based processor) or other type of commercially available processor able to support communications in accordance with each particular embodiment and application.

Figure 2:
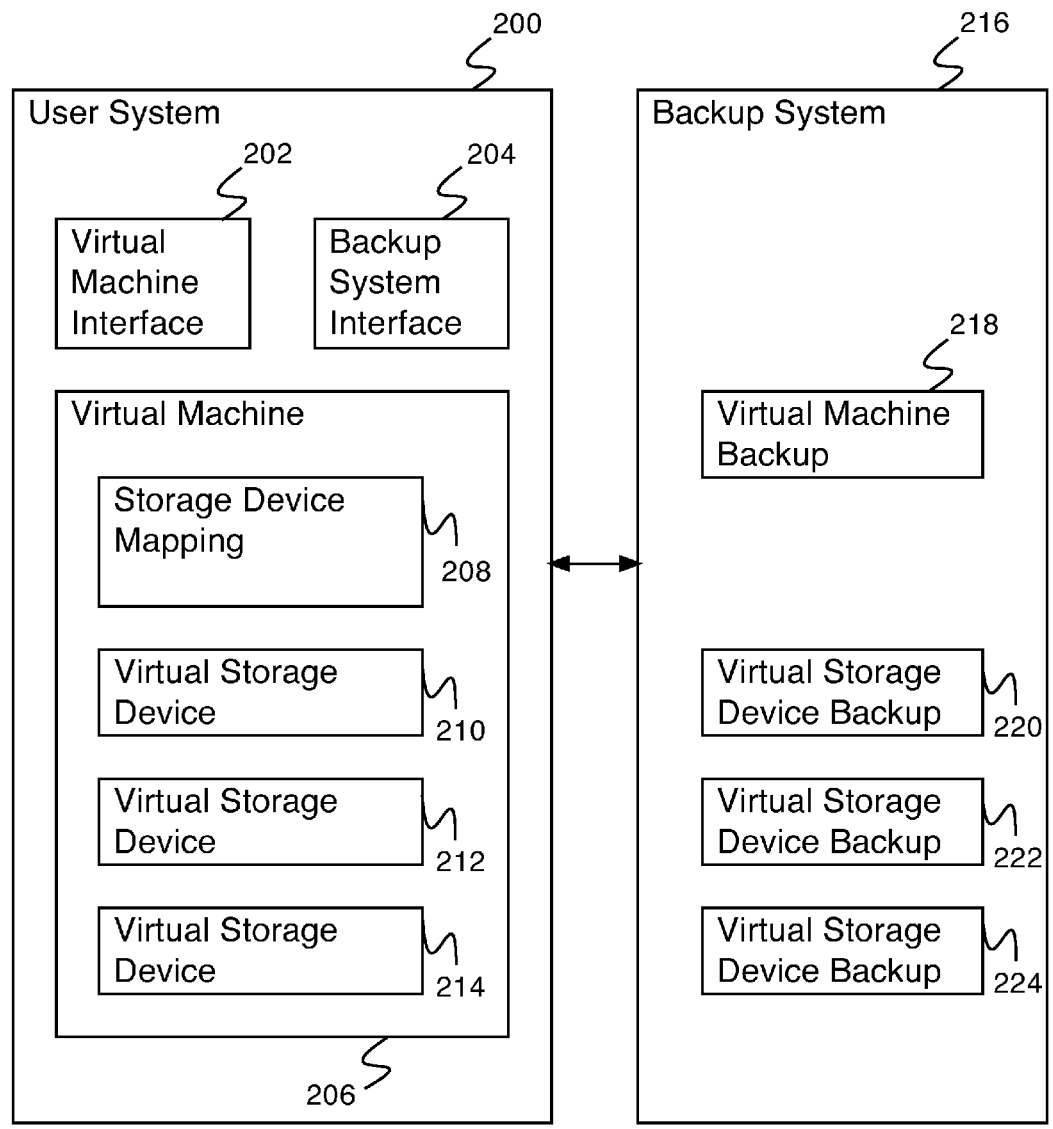
FIG. 2 is a block diagram illustrating an embodiment of a user system and a backup system.

FIG. 2 is a block diagram illustrating an embodiment of a user system and a backup system. In some embodiments, user system 200 comprises user system 102 of FIG. 1. In some embodiments, backup system 216 comprises backup system 104 of FIG. 1. In the example shown, user system 200 comprises virtual machine interface 202, backup system interface 204, and virtual machine 206. A user can access virtual machine 206 via virtual machine interface 202. A user can access backup system 216 via backup system interface 204. Virtual machine 206 comprises storage device mapping 208, virtual storage device 210, virtual storage device 212, and virtual storage device 214. In various embodiments, virtual machine 206 additionally comprises a virtual processor, virtual memory, virtual networking devices, or any other appropriate virtual hardware. In some embodiments, virtual machine 206 comprises a virtual machine running the Windows™ operating system. Virtual storage device 210, virtual storage device 212, and virtual storage device 214 comprise virtual storage devices for storing data. In various embodiments, virtual machine 206 comprises 1, 3, 6, 13, 22, 122, or any other appropriate number of virtual storage devices. Each of virtual storage device 210, virtual storage device 212, and virtual storage device 214 comprises a virtual storage device serial number. When virtual storage device 210, virtual storage device 212, and virtual storage device 214 are mounted to virtual machine 206 (e.g., when virtual machine 206 is starting up), each virtual storage device receives a virtual storage device volume name (e.g., A:, B:, C:, D:, E:, F:, G:, H:, I:, J:, K:, L:, M:, N:, O:, P:, Q:, R:, S:, T:, U:, V:, W:, X:, Y:, Z:, a mounted volume identifier, etc.). In various embodiments, a virtual storage device volume name comprises a label, a volume mount point, or any other appropriate mounted volume identifier. Storage device mapping 208 comprises a mapping between virtual storage device serial numbers and virtual storage device volume names.

Backup system 216 comprises virtual machine 218, virtual storage device backup 220, virtual storage device backup 222, and virtual storage device backup 224. Backup system 216 comprises a historical record of virtual machine 206. In some embodiments, backup system 216 comprises multiple backups of virtual machine 206 at different times and/or dates. In some embodiments, backup system 216 comprises full backups of virtual machine 206. In some embodiments, backup system 216 comprises incremental backups of virtual machine 206. In various embodiments, backup system 216 comprises a historical record of multiple virtual machines (e.g., multiple virtual machines running on user system 200, multiple virtual machines running on multiple different user systems, or any other appropriate virtual machines). In some embodiments, virtual machine backup 218 comprises a backup of the components of virtual machine 206 excluding virtual storage device 210, virtual storage device 212, and virtual storage device 214. In various embodiments, virtual machine backup 218 comprises a backup of storage device mapping 208, of a virtual processor, virtual memory, virtual networking devices, or of any other appropriate virtual hardware. In various embodiments, backup system 216 comprises 1, 3, 6, 13, 22, 122, or any other appropriate number of virtual storage device backups. In some embodiments, the number of virtual storage device backups is equal to the number of virtual storage devices of virtual machine 206. In various embodiments, each virtual storage device backup comprises a backup of a single virtual storage device (e.g., virtual storage device backup 220 comprises a backup of virtual storage device 210). In various embodiments, each virtual storage device backup comprises full backups, incremental backups, a combination of full and incremental backups, a combination of full and incremental backups, or any other appropriate backup data. In some embodiments, virtual storage device backup 220, virtual storage device backup 222, and virtual storage device backup 224 can be accessed directly by a user (e.g., via backup system interface 204).

A user interacting with user system 200 can access data on virtual machine 206 via virtual machine interface 202 and can access data on backup system 216 via backup system 216. In some embodiments, a user can recover backup data by accessing data on backup system 216 and indicating a data location (e.g., a data path) on a virtual storage device backup (e.g., virtual storage device backup 220) and a backup date for recovery. This process is shown in the flow diagram of FIG. 3. In some embodiments, a user can recover backup data by accessing data on virtual machine 206 and indicating a data location (e.g., a data path) on a virtual storage device (e.g., virtual storage device 210) and a backup date for recovery. This process is shown in the flow diagram of FIG. 6.

Figure 3:
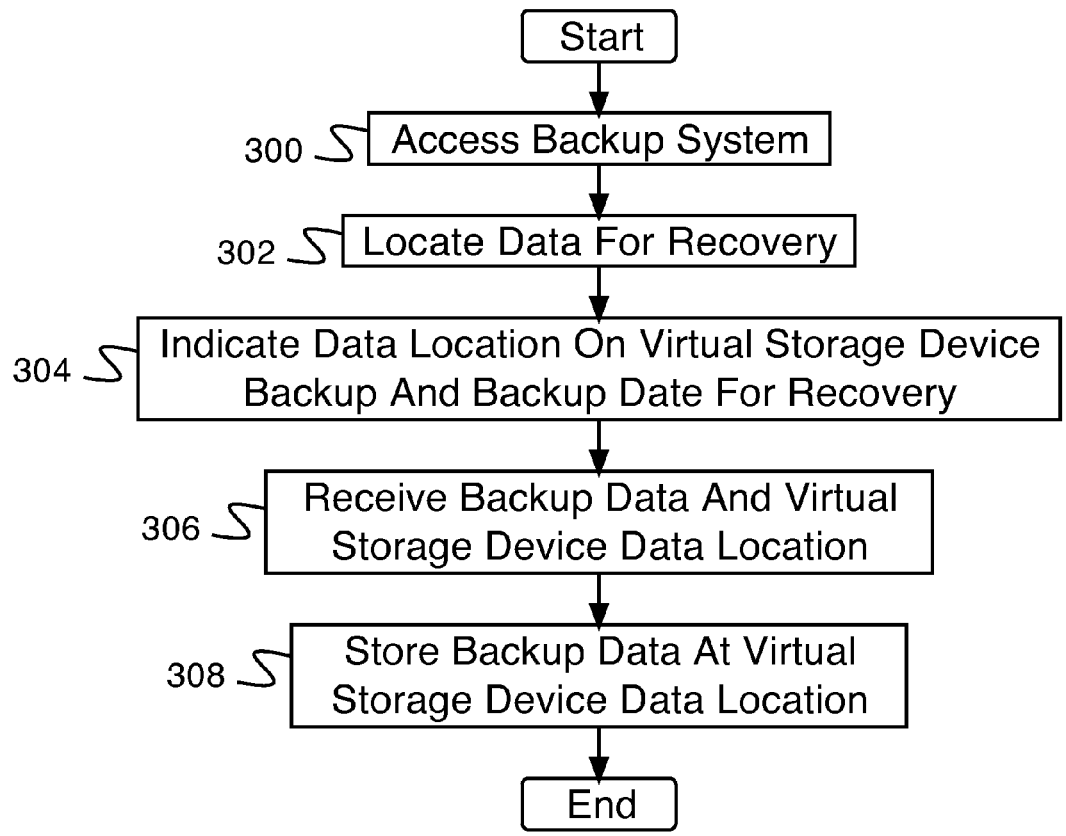
FIG. 3 is a flow diagram illustrating an embodiment of a process for recovering backup data.

FIG. 3 is a flow diagram illustrating an embodiment of a process for recovering backup data. In some embodiments, the process of FIG. 3 is executed by a computer system user accessing a user system (e.g., user system 200 of FIG. 2). In some embodiments, the computer system user has access to a running virtual machine. In some embodiments, the backup data is associated with a backed up virtual machine. In some embodiments, the backup data is retrieved without instantiating the backed up virtual machine. In the example shown, in 300, a backup system is accessed (e.g., via a backup system interface). In 302, a data is located for recovery (e.g., a data on the backup storage device, for example, a data stored in a virtual storage device backup). In various embodiments, the data comprises one or more files, one or more folders, or any other appropriate data. In 304, a data location (e.g., a data path) on a virtual storage device backup and a backup date for recovery are indicated (e.g., to the backup system). In 306, a backup data and virtual storage device data location are received. In some embodiments, the virtual storage device data location comprises the location where the backup data should be stored. In some embodiments, the virtual storage device data location comprises a virtual storage device volume name and a virtual storage device path. In some embodiments, the virtual storage device path of the virtual storage device data location comprises the data location on the virtual storage device backup. In some embodiments, the virtual storage device volume name of the virtual storage device data location is determined using a storage device mapping. In 308, the backup data is stored at the virtual storage device data location. In some embodiments, the backup data is stored at a new location (e.g., a location other than the virtual storage device data location). In some embodiments, the backup data overwrites original data at the virtual storage device data location.

Figure 4:
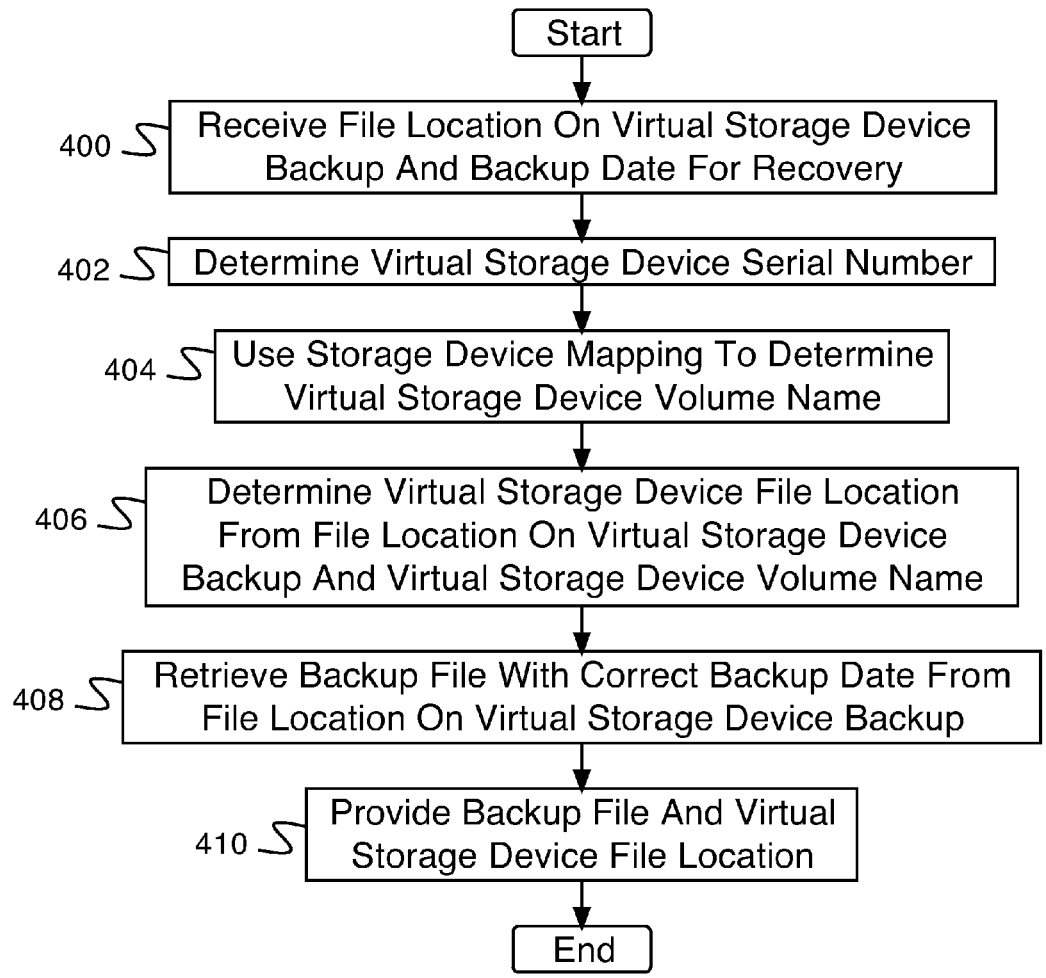
FIG. 4 is a flow diagram illustrating a process for providing a backup file and virtual storage device file location.

FIG. 4 is a flow diagram illustrating a process for providing a backup file and virtual storage device file location. In some embodiments, the process of FIG. 4 is executed by a backup system (e.g., backup system 216 of FIG. 2). In some embodiments, the process of FIG. 4 is executed in response to receiving a file location on a backup storage device and a backup date for recovery (e.g., from a from a computer system user in 304 of FIG. 3). In the example shown, in 400, a file location on a virtual storage device backup and a backup date for recovery are received. In 402, a virtual storage device serial number is determined. In some embodiments, a virtual storage device serial number is determined from the virtual storage device backup. In some embodiments, the virtual storage device serial number comprises an NTFS boot sector header. In some embodiments, the virtual storage device serial number comprises any other appropriate unique device signature. In some embodiments, determining a virtual storage device serial number comprises reading a partition table and determining an appropriate partition. In some embodiments, a partition table comprises a master boot record. In 404, a storage device mapping is used to determine a virtual storage device volume name. In 406, a virtual storage device file location is determined from the file location on the virtual storage device backup and the virtual storage device volume name. In some embodiments, the virtual storage device file location comprises the path of the file location on the virtual storage device backup on the volume indicated by the virtual storage device volume name. In 408, the backup file with the correct backup date is retrieved from the file location on the virtual storage device backup. In 410, the backup file and the virtual storage device file location are provided.

Figure 5:
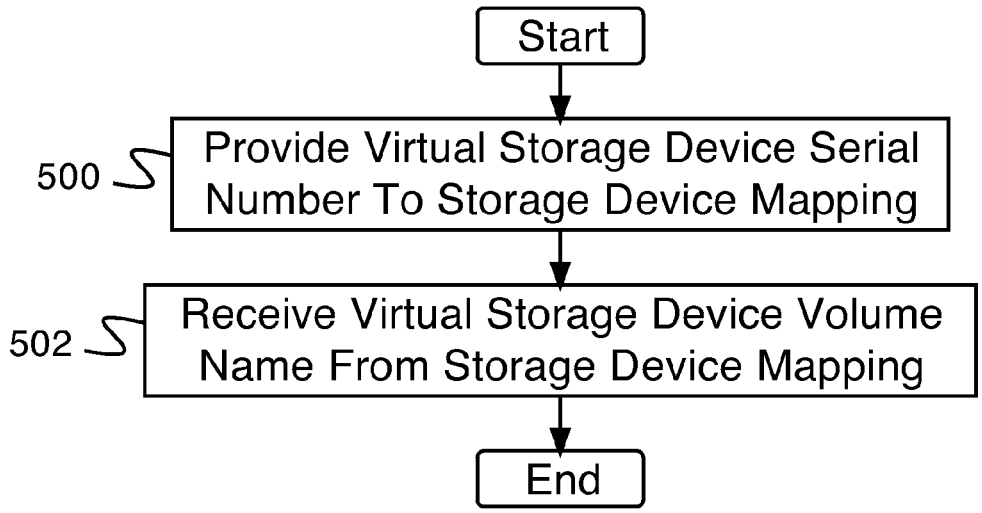
FIG. 5 is a flow diagram illustrating an embodiment of a process for using a storage device mapping to determine a virtual storage device volume name.

FIG. 5 is a flow diagram illustrating an embodiment of a process for using a storage device mapping to determine a virtual storage device volume name. In some embodiments, the process of FIG. 5 implements 404 of FIG. 4. In the example shown, in 500, the virtual storage device serial number is provided to a storage device mapping. In 502, a virtual storage device volume name is received from the storage device mapping.

Figure 6:
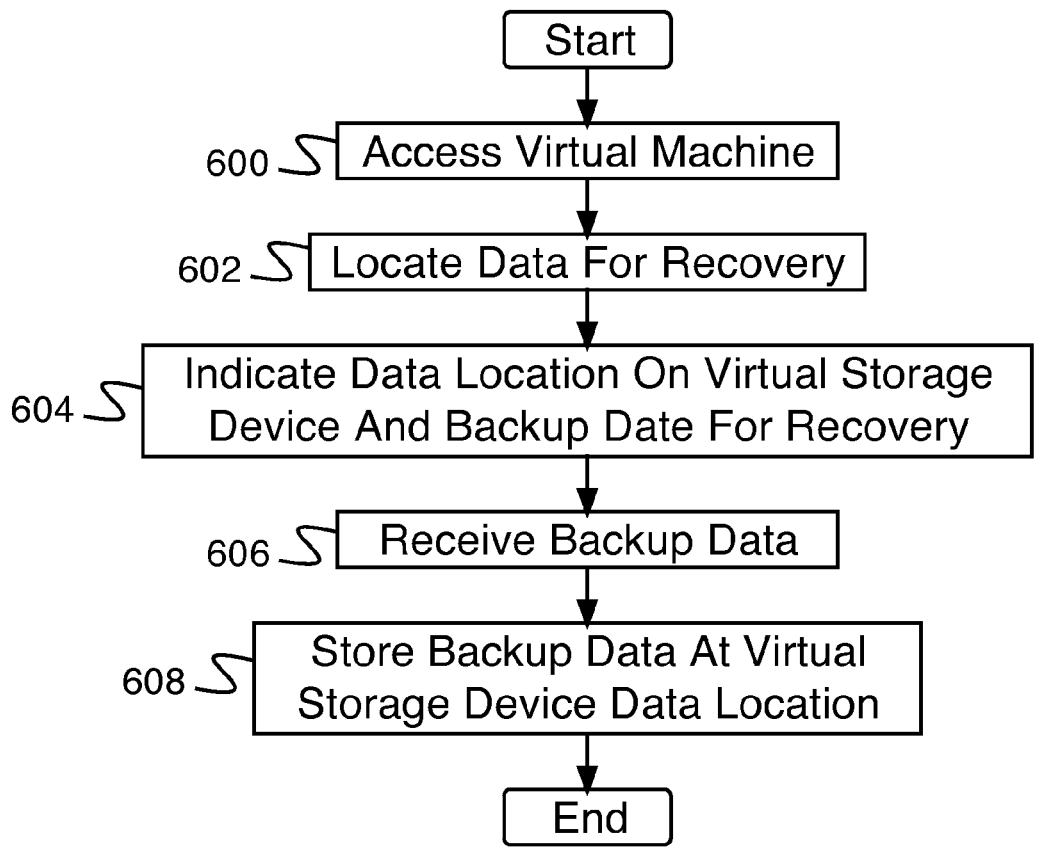
FIG. 6 is a flow diagram illustrating an embodiment of a process for recovering backup data.

FIG. 6 is a flow diagram illustrating an embodiment of a process for recovering backup data. In some embodiments, the process of FIG. 6 is executed by a computer system user accessing a user system (e.g., user system 200 of FIG. 2). In some embodiments, the computer system user has access to a running virtual machine. In some embodiments, the backup data is associated with a backed up virtual machine. In some embodiments, the backup data is retrieved without instantiating the backed up virtual machine. In the example shown, in 600, a virtual machine is accessed (e.g., via a virtual machine interface). In 602, a data is located for recovery (e.g., a data on the virtual machine, for example, a data stored in a virtual storage device). In various embodiments, the data comprises one or more files, one or more folders, or any other appropriate data. In 604, a data location (e.g., a data path) on a virtual storage device and a backup date for recovery are indicated (e.g., to a backup system). In 606, a backup data is received. In 608, the backup data is stored at the virtual storage device data location. In some embodiments, the backup data is stored at a new location (e.g., a location other than the virtual storage device data location). In some embodiments, the backup data overwrites original data at the virtual storage device data location.

Figure 7:
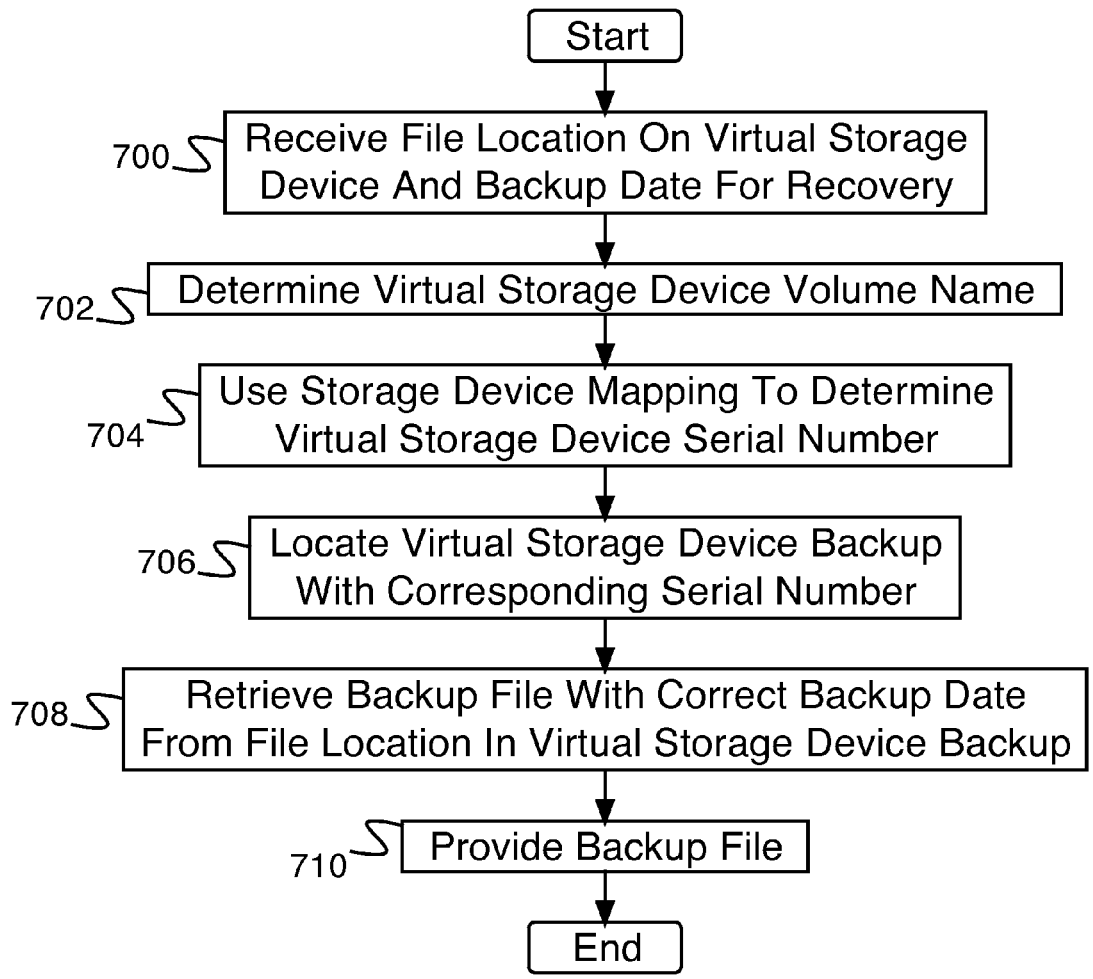
FIG. 7 is a flow diagram illustrating an embodiment of a process for providing a backup file.

FIG. 7 is a flow diagram illustrating an embodiment of a process for providing a backup file. In some embodiments, the process of FIG. 7 is executed by a backup system (e.g., backup system 216 of FIG. 2). In some embodiments, the process of FIG. 7 is executed in response to receiving a file location on a virtual storage device and a backup date for recovery (e.g., from a from a computer system user in 604 of FIG. 6). In the example shown, in 700, the file location on a virtual storage device and a backup date for recovery are received. In 702, the virtual storage device volume name is determined. In some embodiments, the virtual storage device volume name comprises part of the file location. In 704, the storage device mapping is used to determine the virtual storage device serial number. In 706, the virtual storage device backup with corresponding serial number is determined. In various embodiments, the virtual storage device backup with corresponding serial number is determined by checking each virtual storage device backup serial number, by using a table, by using a mapping, by executing a method, or by any other appropriate procedure. In 708, the backup file with the correct backup date is retrieved from the file location in the virtual storage device backup (e.g., the virtual storage device backup with the corresponding serial number). In 710, the backup file is provided.

Figure 8:
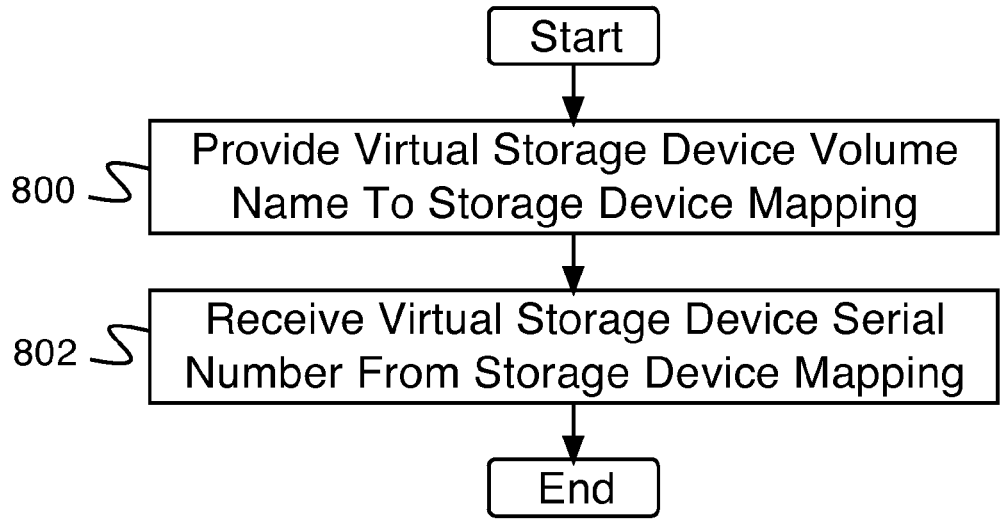
FIG. 8 is a flow diagram illustrating an embodiment of a process for using a storage device mapping to determine a virtual storage device serial number.

FIG. 8 is a flow diagram illustrating an embodiment of a process for using a storage device mapping to determine a virtual storage device serial number. In some embodiments, the process of FIG. 8 implements 704 of FIG. 7. In the example shown, in 800, the virtual storage device volume name is provided to the storage device mapping. In 802, the virtual storage device serial number is received from the storage device mapping.

Figure 9:
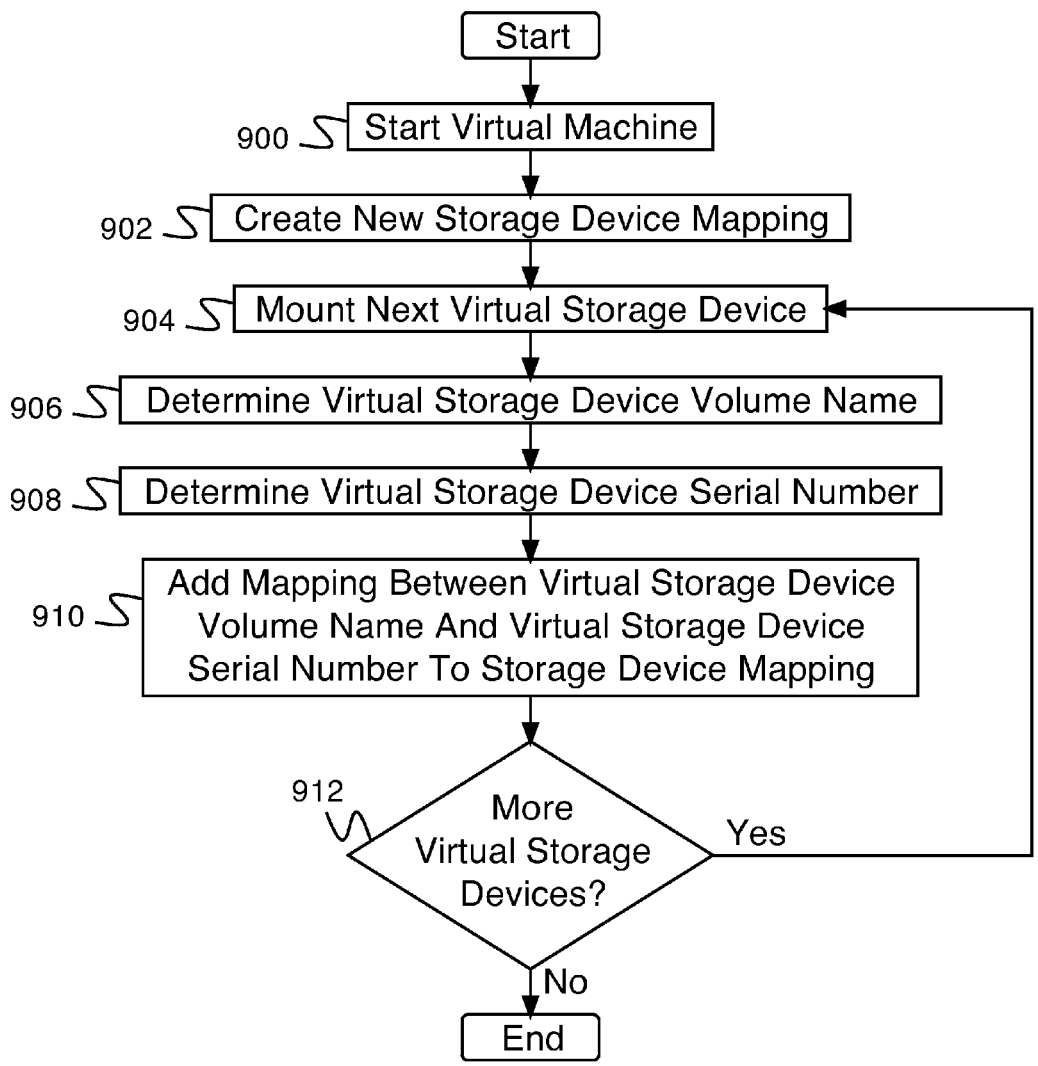
FIG. 9 is a flow diagram illustrating an embodiment of a process for creating a storage device mapping.

FIG. 9 is a flow diagram illustrating an embodiment of a process for creating a storage device mapping. In some embodiments, the process of FIG. 9 is used by a user system (e.g., user system 200 of FIG. 2) to create a storage device mapping (e.g., storage device mapping 208 of FIG. 2). In the example shown, in 900, a virtual machine is started. In some embodiments, the virtual machine does not have any virtual storage devices mounted when it is started. In 902, a new storage device mapping is created (e.g., created on the virtual machine). A new storage device mapping comprises an empty storage device mapping (e.g., it does not yet contain any mappings). In 904, the next virtual storage device is mounted (e.g., mounted on the virtual machine). In some embodiments, the next virtual storage device comprises the first virtual storage device. In some embodiments, mounting a virtual storage device comprises making the virtual storage device accessible by the virtual machine and assigning it a volume name. In some embodiments, the volume name is assigned arbitrarily to the virtual storage device. In 906, the virtual storage device volume name is determined. In some embodiments, a virtual storage device can be queried directly for its volume name. In 908, the virtual storage device serial number is determined. In some embodiments, a virtual storage device serial number is determined by reading header data. In some embodiments, the virtual storage device serial number comprises an NTFS boot sector header. In some embodiments, the virtual storage device serial number comprises any other appropriate unique device signature. In 910, a mapping between the virtual storage device volume name and the virtual storage device serial number is added to the storage device mapping. In various embodiments, adding a mapping between the virtual storage device volume name and the virtual storage device serial number comprises adding a data to a table, an array, a dictionary, or any other appropriate data structure for maintaining the mapping. In 912, it is determined whether there are more virtual storage devices (e.g., more virtual storage devices to be mounted). If it is determined that there are more virtual storage devices, control passes to 904.

In some embodiments, a virtual storage device is divided into multiple partitions. When a virtual storage device is accessed, its partition table is read and its partitioning is determined (e.g., whether the disk is a single partition, two partitions, three partitions, etc., along with the location of each partition within the disk). In some embodiments, a partition table comprises a master boot record. Each partition is treated as a separate virtual storage device, comprising its own virtual storage device volume name and virtual storage device serial number. A mapping is added to the storage device mapping for each partition of each virtual storage device. A map between a virtual storage device volume name and a virtual storage device backup serial number uniquely associates a mounted partition of a virtual storage device with a virtual storage device backup.

Figure 10:
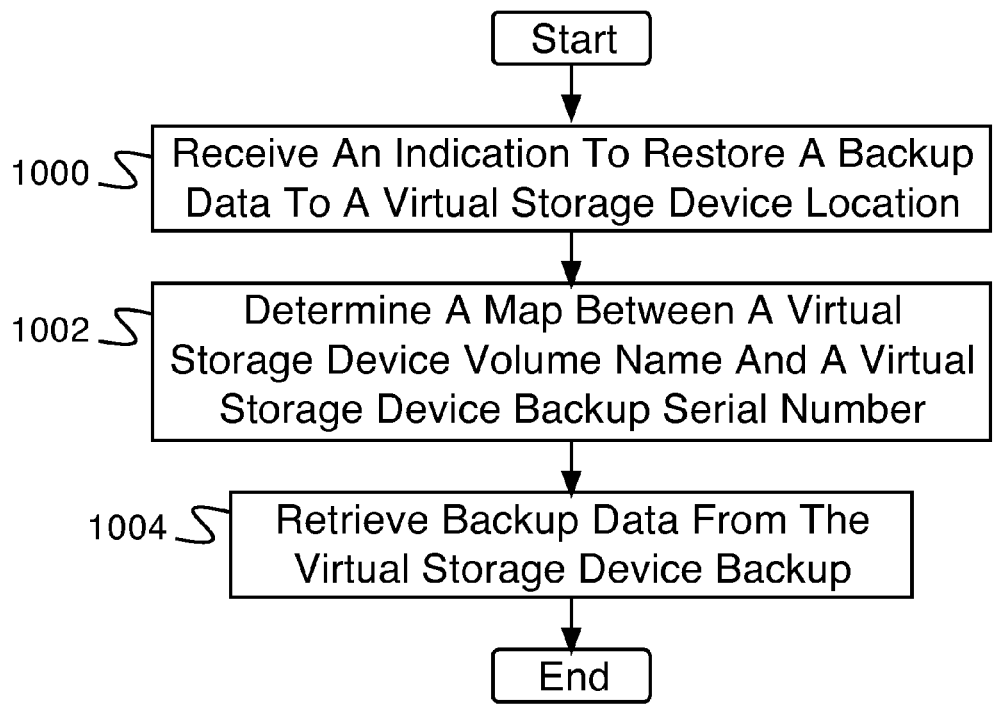
FIG. 10 is a flow diagram illustrating an embodiment of a process for restoring a backup data.

FIG. 10 is a flow diagram illustrating an embodiment of a process for restoring a backup data. In some embodiments, the process of FIG. 10 is executed by a backup system. In the example shown, in 1000, an indication to restore a backup data to a virtual storage device location is received. In 1002, a map is determined between a virtual storage device volume name and a virtual storage device backup serial number. In 1004, backup data is retrieved from the virtual storage device backup.

FIG. 11 illustrates an embodiment of a master boot record. In the example shown, a master boot record comprises a partition table describing disk partitioning (e.g., whether the disk is a single partition, two partitions, three partitions, etc., along with the location of each partition within the disk) at bytes 446 through 509. For example, the master boot record is the record opened from a virtual machine image backup. The disk partition table is located at the beginning of the disk of the virtual machine. The system locates all the partitions of the disk of the virtual machine image and reads each partition for a unique signature or serial number (e.g., for a Windows case, the NTFS Boot Sector header at the beginning of the partition is read).

FIG. 12 illustrates an embodiment of an NTFS boot sector header. In the example shown, a new technology file system (NTFS) boot sector header comprises a volume serial number at byte offset 0x48. The NTFS header also includes bytes per sector, sectors per cluster, reserved bytes, bytes not used, a media descriptor, sectors per track, number of heads, hidden sectors, total sectors, master file table start cluster, master file table mirror start cluster, clusters per file record segments, clusters per index, and a cyclic redundancy check.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for restoring a backup data, comprising:
a processor configured to:
receive an indication of stored data in a running virtual machine to restore, wherein the stored data in the running virtual machine has a current virtual storage device location with a current virtual storage device volume name;
receive an indication of a selection of a backup image of a virtual machine with a previous virtual storage device location and previous virtual storage device volume name, wherein the current virtual storage device volume name is different than the previous virtual storage device volume name, wherein the backup image of the virtual machine comprises a backup file for the virtual machine and a virtual storage device backup for each virtual storage device associated with the virtual machine;
determine a map between the current virtual storage device volume name and a virtual storage device backup serial number; and
retrieve backup data from the virtual storage device backup corresponding with the stored data using the virtual storage device backup serial number;
copy the backup data to the current virtual storage device location in the running virtual machine; and
a memory coupled to the processor and configured to provide the processor with instructions.

2. The system of claim 1, wherein the processor is further configured to store the backup data in a new location.

3. The system of claim 1, wherein the stored data to restore comprises one or more files.

4. The system of claim 1, wherein the stored data to restore comprises one or more directories.

5. The system of claim 1, wherein the backup data comprises backup data stored on a virtual storage device backup.

6. The system of claim 1, wherein the stored data is stored on a virtual storage device on the running virtual machine.

7. The system of claim 1, wherein determining the map between the current virtual storage device volume name and the virtual storage device backup serial number comprises determining a current virtual storage device serial number based on the current virtual storage device volume name.

8. The system of claim 1, wherein retrieving the backup data comprises determining a virtual storage device backup based on the virtual storage device backup serial number.

9. The system of claim 1, wherein the virtual storage device is associated with a virtual machine running the Windows™ operating system.

10. The system of claim 1, wherein the current or previous virtual storage device volume name comprises one of A:, B:, C:, D:, E:, F:, G:, H:, I:, J:, K:, L:, M:, N:, O:, P:, Q:, R:, S:, T:, U:, V:, W:, X:, Y:, Z:.

11. The system of claim 1, wherein the current virtual storage device volume name is arbitrarily assigned to the virtual storage device.

12. The system of claim 1, wherein the backup data is retrieved without instantiating the associated backed up virtual machine.

13. The system of claim 1, wherein the virtual storage device backup comprises full backups.

14. The system of claim 1, wherein the virtual storage device backup comprises incremental backups.

15. The system of claim 1, wherein the backup data is retrieved using a data path and a date.

16. The system of claim 1, wherein a map between a virtual storage device volume name and a virtual storage device backup serial number uniquely associates a mounted partition of a virtual storage device with a virtual storage device backup.

17. The system of claim 16, wherein the virtual storage device serial number comprises an NTFS boot sector header.

18. A method for restoring a backup data, comprising:
receiving an indication of stored data in a running virtual machine to restore, wherein the stored data in the running virtual machine has a current virtual storage device location with a current virtual storage device volume name;
receiving an indication of a selection of a backup image of a virtual machine with a previous virtual storage device location and previous virtual storage device volume name, wherein the current virtual storage device volume name is different than the previous virtual storage device volume name, wherein the backup image of the virtual machine comprises a backup file for the virtual machine and a virtual storage device backup for each virtual storage device associated with the virtual machine;
determining a map between the current virtual storage device volume name and a virtual storage device backup serial number;
retrieving backup data from the virtual storage device backup corresponding with the stored data using the virtual storage device backup serial number; and
copying the backup data to the current virtual storage device location in the running virtual machine.

19. A computer program product for restoring a backup data, the computer program product being embodied in a non-transitory computer readable storage medium and comprising computer instructions for:
receiving an indication of stored data in a running virtual machine to restore, wherein the stored data in the running virtual machine has a current virtual storage device location with a current virtual storage device volume name;
receiving an indication of a selection of a backup image of a virtual machine with a previous virtual storage device location and previous virtual storage device volume name, wherein the current virtual storage device volume name is different than the previous virtual storage device volume name, wherein the backup image of the virtual machine comprises a backup file for the virtual machine and a virtual storage device backup for each virtual storage device associated with the virtual machine;
determining a map between the current virtual storage device volume name and a virtual storage device backup serial number;
retrieving backup data from the virtual storage device backup corresponding with the stored data using the virtual storage device backup serial number; and
copying the backup data to the current virtual storage device location in the running virtual machine.

* * * * *